United States Patent [19]

D'Agostino et al.

[11] 4,339,473

[45] Jul. 13, 1982

[54] GAMMA RADIATION GRAFTING PROCESS FOR PREPARING SEPARATOR MEMBRANES FOR ELECTROCHEMICAL CELLS

[75] Inventors: Vincent F. D'Agostino, Huntington; Joseph Y. Lee, Lake Grove, both of N.Y.

[73] Assignee: Rai Research Corporation, Hauppauge, N.Y.

[21] Appl. No.: 182,135

[22] Filed: Aug. 28, 1980

[51] Int. Cl.³ .................................................. B05D 3/06
[52] U.S. Cl. ................................. 427/44; 204/159.19; 429/254
[58] Field of Search .................. 427/44, 54.1, 35, 36; 204/159.19; 429/247, 249, 254

[56] References Cited

U.S. PATENT DOCUMENTS

| | | | |
|---|---|---|---|
| 3,088,791 | 5/1963 | Cline et al. | 427/36 |
| 3,322,661 | 5/1969 | Yoshikawa et al. | 204/159.17 |
| 3,427,206 | 2/1969 | Scardaville et al. | 427/44 |
| 3,955,014 | 5/1976 | Mostev et al. | 427/54 |

Primary Examiner—John H. Newsome

[57] ABSTRACT

This invention relates to an irradiation grafting process for preparing separator membranes for use in electrochemical cells, comprising contacting a polymeric base film with an aqueous solution of a hypophilic monomer and a polymerization retardant; and irradiating, said contacted film to form a graft membrane having low electrical resistivity and having monomer molecules uniformly grafted thereon.

16 Claims, No Drawings

GAMMA RADIATION GRAFTING PROCESS FOR PREPARING SEPARATOR MEMBRANES FOR ELECTROCHEMICAL CELLS

BACKGROUND

Electrochemical cells may be classified as primary or secondary. Primary cells are those that derive electrical energy from a chemical state, and are those whose electrodes are generally not rechargeable. Examples of primary battery systems are those having as electrodes mercury-zinc; silver-zinc; lead-zinc; copper-zinc; copper-magnesium; and silver-magnesium. Secondary cells are basically electrical energy storage cells, and are rechargeable electrically by passing a current through the cell in a direction reversed from that of discharge. Illustrative of secondary battery systems are those having as electrodes, nickel-cadmium; silver-zinc and silver-cadmium.

In either case, the cell is made up of two half-cells, each comprising an electronic conducting phase or electrode in contact with a second phase called an electrolyte in which ionic conduction takes place. A common electrolyte used in both primary and secondary cells is a 30 to 40% solution of KOH. The electrolyte associated with the cathode is referred to as the catholyte and that associated with anode is the anolyte. In some cells, the catholyte and anolyte are different solutions and therefore require a separator membrane to prevent the two solutions from physically mixing. In other cells, the catholyte and anolyte are the same, in which case the separator functions to physically separate the cathode and anode.

Alkaline secondary electrochemical cells are extremely valuable for various commercial, military and aerospace applications. However, this apparent advantage is offset by the disadvantage of limited cycle life. For example, in common secondary alkaline electrochemical cells in which silver is the positive electrode, the transmigration of silver oxides dissolved or suspended in the alkaline electrolyte to the negative electrode results in local couples and self-discharge of the negative plate. Also, in secondary alkaline electrochemical cells in which zinc is an electrode, zinc dendrites deposited on the negative plate during charge, as a result of the reduction of potassium zincate in the alkaline electrolyte, rapidly bridge the narrow gap between the cathode and the anode, thereby short-circuiting the cell.

In the past, battery engineers have sought to obviate these disadvantages through the use of various types of separator membranes. In order to be effective, the separator membranes must possess certain physical, as well as chemical properties, such as low electrolytic resistance; low resistance to hydroxyl migration and high resistance to silver oxide migration; and high resistance to oxidation, particularly in alkaline solutions at high temperatures. Furthermore, the membrane must possess sufficient mechanical strength to withstand the rigors of battery assembly and to prevent zinc dendrite growth or treeing between the cathode and anode.

Then known separator membranes, such as microporous and cellulosic materials, did not possess these physical and chemical properties and proved to be unsatisfactory for use in secondary alkaline electrochemical cells, especially for those having silver electrodes.

To obviate these disadvantages associated with the use of known separator membranes battery engineers developed membranes with improved characteristics by permanently bonding ionizable groups, such as a carboxyl and sulfonic acid groups, onto an inert polymer film using irradiation grafting techniques. Membranes of this type and procedures for their manufacture are disclosed in U.S. Pat. Nos. 4,201,641, 3,427,206 and 4,012,303. While such membranes are relatively effective, they too have several disadvantages, the most significant of which result from the methods employed to prepare them.

For example, in the known irradiation grafting procedures, the solvents used are aromatic or halogenated hydrocarbon solvents, such as benzene, carbon tetrachloride and methylene chloride. The use of such solvents is disadvantageous in that certain of them are health hazards because of high flammability and because such solvents can be toxic to the user. In addition, these solvents are difficult to dispose of after use because they are harmful to the environment. Further, in recent years, the cost of such solvents has increased significantly, resulting in a concomitant increase in the cost of the separator membranes prepared by processes which employ such solvents. In other known procedures, as for example that described in U.S. Pat. No. 4,201,641, mixtures of one of the aforementioned hydrocarbon solvents and water are used. In addition to the above-mentioned disadvantages, this process requires large amounts of the grafting monomer, i.e., greater than 30% by volume, or otherwise aqueous and organic solvent components tend to separate into layers. Also in this process, the organic solvent is a critical component or otherwise the the resistivity of the separator membrane will be unacceptably high. Thus, the net result is that larger amounts of the grafting monomer must be used, which causes an increased likelihood of waste of the monomer reactant.

Certain of these known irradiation procedures also suffer from the defect that a homopolymer of the grafting monomer is formed during the conduct of the irradiation procedures. The homopolymerization side reaction depletes the amount of monomer available for grafting, and results in a non-homogenous graft separator membrane. Furthermore, the homopolymer adheres to the separator membrane relatively strong, and is difficult to remove. The adhering homopolymer reduces the usefulness of the separator membrane by increasing its resistance as much as 1000 percent.

It is therefore an object of this invention to provide an irradiation grafting process for preparing an improved separator membrane for use in primary and secondary electrochemical cells which has low electrolytic resistance, high ohmic resistance and low resistance to hydroxyl migration, but high resistance to silver oxide migration.

It is a further object of this invention to provide an irradiation grafting process for preparing a separator membrane which is resistant to oxidative degradation and hydrolytic attack in electrolyte solutions, particularly at high temperatures.

It is also an object of this invention to provide an irradiation grafting process for preparing separator membranes, in which homopolymerization of grafting monomer is either eliminated or greatly retarded.

It is still another object of this invention to provide an irradiation grafting process for preparing separator membranes which employ water, rather than aromatic and halogenated hydrocarbon solvents and aqeous mixtures thereof as the process solvent.

It is yet another object of this invention to provide an irradiation grafting process for preparing separator membranes in which the percent graft is not sensitive to the radiation dose rate, and high percent grafts can be obtained with short term, high dose irradiation.

Other objects and advantages will be apparent from the following disclosure and appended claims.

SUMMARY OF THE INVENTION

These objects are achieved by the present invention which provides an irradiation grafting process for preparing separator membranes for use in electrochemical cells. The present process comprises the steps of:

(a) forming a graft polymerization medium consisting essentially of water, one or more ethylenically unsaturated hydrophilic monomers, and one or more homo- and/or co-polymerization retardants selected from the group consisting of cupric salts, ferrous salts and mixtures thereof, referred to hereinafter as polymerization retardants, in an amount which is sufficient to retard polymerization of said monomers (inclusive of homopolymerization and copolymerization);

(b) placing said medium in contact with an inert polymeric base film; and (c) irradiating said contacted film in an amount sufficient to graft polymerize said monomers onto said film.

The electrochemical cells in which the separator membranes prepared in accordance with the claimed process are used are similar to previously used cells subject to the modification described herein. The electrochemical cells in which the membrane of this invention are especially useful are of the secondary alkaline type. Generally, an enclosure is provided which is divided into a catholyte and an anolyte compartment by the membrane, and which contains an alkaline electrolyte. The catholyte compartment contains a positive electrode, which may be constructed of a known electrode material such as silver or nickel and the anolytic compartment contains a negative electrode, likewise constructed of a known electrode material such as zinc or cadmium. Each electrode may contain a single plate or a plurality of plates, or multicompartment cells may also be used, as is known in the art. Conventional electrolytes such as alkaline potassium hydroxide may be used.

The semi-permeable membranes prepared in accordance with this invention are also useful for a wide variety of applications in other areas. For example, the membranes are useful in such differing areas as dialysis, electrodialysis, electrolysis, fuel cells, biological systems and in most other situations where a semi-permeable membrane is required as a cell separator and where operating conditions are such that the deposited metals will not be leached out of the membrane.

DETAILED DESCRIPTION OF THE INVENTION

In accordance with required step (a) of the process of this invention, an aqueous base solution comprised of one or more ethylenically unsaturated monomers, and a polymerization retardant selected from the group consisting of water soluble inorganic cupric and ferrous salts in an amount which is sufficient to perform the retarding function is formed. Preferred for use in the process of this invention are ethylenically unsaturated hydrophilic monomers which possess hydrophilic properties and which function as ionic conductors when grafted to the inert polymeric base film. The expression "hydrophilic monomer" as used in this disclosure refers to any monomer which is hydrophilic or which may be made hydrophilic by some subsequent treatment as for example, sufonation, quaternization, carboxylation and the like, and which is substantially water soluble. Illustrative of useful hydrophilic monomers which may be utilized in the process of this invention are sulfonated perhalo vinyl monomers, such as sulfonated $\alpha,\beta,\beta$-trifluoro styrene; linear and branched chain sulfonated fluoro alkenyl monomers; ethylenically unsaturated carboxylic acid monomers, such as acrylic acid, maleic acid, fumaric acid, and methacrylic acid; vinyl aromatic amine monomers, such a vinyl pyridinium; quaternized vinyl aromatic amine monomers, such as vinyl pyridinium methyl iodide; and vinyl monomers having a pendant ion-exchange group, such acrylonitrile and hydrolyzed vinyl acetate.

The choice of hydrophilic monomer is not critical to the conduct of the process of this invention. The desired end use of the seprator membrane will dictate the choice of hydrophilic monomer in a particular situation. For example, it has been found that under extreme oxidative conditions, such as are found in chlor-alkali and fuel cells, primary degradation of the monomer occurs at the C—H bonds. Thus, in using the process of this invention to prepare separator membranes for use in these types of electrolytic cells, more resistant halogen based hydrophilic monomers are employed. Similarly, in situations where the process is employed to prepare membranes for use under milder operative conditions, as for example a conventional battery, hydrophilic hydrocarbon monomers, as for example, acrylic and methacrylic acids, may be used.

The quantity of monomer employed is not critical to the conduct of the process and can be varied over a large range depending on the degree of grafting desired and the solubility of the monomer in water. For example, the process can be carried out effectively employing monomer concentrations as low as 0.5 weight percent to as high as 25 weight percent, based on the total weight of the base solution. In the preferred embodiments of this invention, the weight percent of monomer will vary from about 0.5 to about 20, based on the total weight of the solution.

The water soluble iron and copper salts included in the base solution are effective for inhibiting polymerization of the hydrophilic monomer while they do not inhibit the uniform grafting of the monomer. Illustrative of such salts are water soluble ferrous salts such as ferrous sulfate, ammonium ferrous sulfate, ferrous chloride, ferrous nitrate and the like, and such cupric salts as cupric sulfate, cupric chloride, cupric nitrate, cupric acetate, and the like. Ferrous sulfate and cupric nitrate are preferred for use in the process of this invention.

The quantity of polymerization retarding ferrous and cupric salts employed should be sufficient to reduce the formation of polymers to substantially zero, or to an extremely low level such that any polymer formed can be easily removed by washing with water. Further, the quantity employed should be such that uniform grafting of the monomer is achieved. It has been found that such results can be achieved when the quantity of salt is within the range of from about 0.1 to about 10 weight percent based on the total weight of the solution. The quantity of polymerization retardant employed is preferably within the range of from about 0.5 to about 8 weight percent.

In accordance with required step (b) of the process of this invention, the aforementioned aqueous base solution is contacted with a suitable inert polymeric base film, preferably such that the surfaces on which the monomer is to be grafted are immersed in the solution. The inert base film to which the hydrophilic monomer is radiation grafted is preferably chosen from polymeric film materials which are resistant to oxidative degradation. Illustrative of such films are those derived from the homo- or co-polymerization of aliphatic and aromatic ethylenically unsaturated compounds, having varying degrees of crosslinking for improved heat and chemical resistance. For example, useful inert polymer films include, polymer films of ethylenically unsaturated monomers, such as polymer films of ethylene,, styrene, vinyl acetate, isobutylene, vinyl alcohol, vinyl ether, vinyl pyrrolidine, and propylene; polymer films of halogenated ehtylenically unsaturated monomer, such as polymer films of tetrafluoroethylene, vinyl chloride, vinyl fluoride, vinylidene chloride and trifluorochloroethylene; copolymer films of an halogenated ethylenically unsaturated monomer and ethylenically unsaturated monomer; and laminated films thereof. Monomers having from 2 to 3 aliphatic carbon atoms are preferred. It may also be desirable to utilize a supported film. For example, the polymeric base film may be supported and laminated to a polymeric cloth, woven mesh, perforated sheet like support member which provides greater mechanical strength.

It has been said that, in general, it is preferable to utilize fluorocarbon based films rather than hydrocarbon base films. Such films are somewhat more inert, particularly under long-term and extreme operating conditions. In most instances, the desired end uses of the membranes will dictate the choice of inert base film. For example, when the membranes are employed in chlor-alkali cells, fluorocarbon based films are preferred, as other types of film may be degraded by the chlorine produced during the operation of the cell. Similarly, when the membrane is to be used in a conventional battery, hydrocarbon base films may be safely used because of the less rigorous operating conditions.

The thickness of the inert polymeric base film is not critical. In general, films ranging in thickness from about 0.5 to about 20 mils, and preferably from about 0.5 to about 5 mil, are satisfactory for use in this invention. One or more layers of base film may be used to achieve the desired thickness. The choice of film thickness will depend on the end use of the membrane, the choice of material, the percentage of monomer grafted and other factors known to those of skill in the art. For example, in the case of radiation grafted films, the electrolytic resistance of the grafted membrane is generally lower when starting with a thinner base film because of the higher percentage of grafting. Yet, thinner base films result in thinner membranes which are less resistant to the rigors of cell construction and of zinc dendrite growth. Thus, in those instances where greater mechanical strength is required, thicker base films are employed; in those instances where lower electrolytic resistance is required, thinner base films are employed; and in those instances where both low electrolytic resistance and mechanical strength are required, base films of intermediate thickness are employed.

In general, films having a thickness of up to 10 mils are useful in fuel cells, where greater mechanical strength or resistance to back-pressure is required. The thickness of film for use in alkaline secondary electrochemical cells, where low electrolytic resistance and mechanical strength are required, may vary from about 0.5 to about 3 mils and preferably will be in the range of from about 0.5 to about 2 mils.

In accordance with required step (c) of the process of this invention, the base solution and the contacted inert polymeric base film are irradiated for a period of time and in an amount sufficient to graft polymerize the dissolved hydrophilic monomer onto the film to the extent desired. Gamma radiation from conventional sources is preferably employed in the irradiation step. Such sources include, Cobalt 60, strontium 90, cesium 137, electron beams from an accelerator, and the like. Gamma irradiation by Cobalt 60 is preferred.

The irradiation times are not critical, and can vary from hours to days, depending on such factors as the percentage of graft desired; irradiation dose and dosage rate, concentration of monomer in base solution, and other factors known to those of skill in the art. For example, if higher irradiation dose and dose rates, and higher monomer concentrations are employed, irradiation times are less. Conversely, if higher percentage of graft is desired, greater irradiation times are required. Generally, it has been found that percentage grafts of up to about 500% and more can be achieved in an irradiation time of from hours to days when employing the preferred embodiments of this invention as described above, and employing gamma irradiation dose rates within the range of from about 3000 r/hr to more than 30,000 r/hr and a total radiation dose within the range of from about 0.075 Mrad to more than 10 Mrad.

Process temperatures are not critical limitations to process, and can be varied over a wide range as desired. The process is preferably conducted at a temperature of from about −0° C. to about 90° C. For convenience, the reaction is conducted at room temperature.

Similarly, reaction pressures are not critical, and the reaction can be conducted at sub-atmospheric, atmospheric or super-atmospheric pressure. For convenience the reaction is conducted at atmospheric or autogenous pressure.

The following specific examples are presented to more fully illustrate the present invention. In the examples, the abbreviations are identified as follows:

LDPE: is a low denity polyethylene film having a density of about 0.92 and an average molecular weight distribution ratio of about 2 to 3, which is prepared by extruding polyethylene resin.

HDPE: is a high density polyetheylene film having a density of about 0.95 which is prepared by extruding polyethylene resin.

PE: is a pre-crosslinked polyethylene which is prepared by irradiating LDPE with about 90 Mrad of radiation from an electron acceleration.

PP: is polypropylene film prepared by extruding polypropylene resin.

Teflon: is a polytetra fluoroethylene film prepared from a Teflon ® resin manufactured and sold by DuPont, Inc.

AA: is acrylic acid.

MA: is methacrylic acid.

EXAMPLES 1 TO 74

The general irradiation procedure employed in the following examples for the graft polymerization of acrylic or methacrylic acid monomer onto the base film is as follows. A water solution containing the desired amounts of acrylic or methacrylic acid, and ferrous or cupric sulfate salt is prepared and placed in an irradiation chamber. The base film, covered with paper or other absorbent interlayer and wound into a roll, is immersed in the solution. A vacuum and interlayer flush with nitrogen is applied and re-applied removing any dissolved oxygen from the solution and chamber, and a nitrogen atmosphere. The reactor is then sealed. The roll and solution is then irradiated with gamma radiation using a 15,000 curie Cobalt-60 source for the specified period of time, i.e., from hours to days. The grafted film is then removed, washed in water, dried and weighed to determine the graft percent. The percent graft is determined by the difference between the weight of the final grafted film less the weight of the original base film, divided by the weight of the original base film. The film is then washed in 4% potassium hydroxide at a temperature of 95° C. and dried. The resistance is taken in 40% potassium hydroxide and is the major criteria in determining the effectiveness of the film as a separator for an electrolytic cell. The electrolytic resistance should be sufficiently low to allow passage of electrolyte ions between the catholyte and anolyte. The screening test used to determine the electrolyte resistance of representative membranes of this invention is as described in "Battery Separator Screening Methods" edited by Cooper and Fleischer, published by the AF Aero Propulsion Laboratory, Wright Patterson, Ohio. Procedurally, the membrane is cut and put into a sample holder. After soaking in 40% KOH for 24 hours, each sample holder was inserted into conventional resistance cell, and the resistance read off with a RAI Resistance meter marketed by RAI Corporation. After the initial resistance reading, each of the membranes was then placed in a 40% aqueous solution of potassium hydroxide for from about one to three days and the electrolytic resistance of the membrane was again determined.

Several separator membranes were prepared and evaluated in accordance with the above-described procedure. The process parameters and results are set forth in Tables I to V hereinbelow.

Table I illustrates the grafting of acrylic acid onto differing base films in the presence of varying concentrations of ferrous sulfate.

TABLE I

Grafting of Acrylic Acid Onto Different Films in Water Solution in the Presence of Iron Salts

| Ex | 1 mil Polymeric BASE FILM | Weight % AA | Weight % $FeSO_4 \cdot 7H_2O$ | DOSE RATE rad/hr | TOTAL DOSE, Mrad | % GRAFT | RESISTANCE 40% KOH $m\Omega - in^2$ | QUANTITY OF HOMOPOLYMER |
|---|---|---|---|---|---|---|---|---|
| 1 | LDPE | 20 | 8 | 5625 | 0.49 | 60 | 11 | slight |
| 2 | LDPE | 20 | 4 | 7304 | 0.59 | 60 | 10 | slight |
| 3 | LDPE | 20 | 3 | 7304 | 0.59 | 51 | 9 | slight |
| 4 | LDPE | 20 | 2 | 7304 | 0.59 | 52 | 9 | slight |
| 5 | LDPE | 20 | 1 | 7304 | 0.59 | 59 | 10 | slight |
| 6 | HDPE | 20 | 8 | 5625 | 0.49 | 40 | 25 | slight |
| 7 | HDPE | 20 | 1 | 7304 | 0.59 | 62 | 13 | slight |
| 8 | HDPE | 20 | 0.65 | 7304 | 0.59 | 90 | 10 | slight |
| 9 | HDPE | 20 | 0.35 | 7304 | 0.59 | 111 | 11 | slight |
| 10 | PE | 20 | 4 | 6763 | 0.55 | 57 | 17 | slight |
| 11 | PE | 20 | 1 | 6763 | 0.55 | 144 | 12 | slight |
| 12 | PE | 20 | 0.65 | 6763 | 0.55 | 109 | 13 | slight |
| 13 | PE | 20 | 0.350 | 6763 | 0.55 | 100 | 16 | slight |
| 14 | PP | 20 | 4 | 5518 | 0.49 | 40 | 20 | slight |
| 15 | PP | 20 | 1 | 6634 | 0.54 | 90 | 12 | slight |
| 16 | PP | 20 | 0.65 | 6634 | 0.54 | 111 | slight | |
| 17 | PP | 20 | 0.35 | 6634 | 0.54 | 82 | 12 | slight |
| 18 | TEFLON | 20 | 8 | 5518 | 0.49 | 30 | 18 | slight |
| 19 | TEFLON | 20 | 4 | 6507 | 0.53 | 30 | 25 | slight |
| 20 | TEFLON | 20 | 1 | 6507 | 0.53 | 35 | 18 | slight |
| 21 | TEFLON | 20 | 1 | 6507 | 0.53 | 30 | 20 | slight |

As can be readily seen, the quantity of ferrous sulfate salt is not critical to the percent and uniformity of graft or to the resistivity of the resulting separator membrane. However, the quantity of the salt does affect the degree of homopolymerization. Accordingly, as was indicated above, the quantity of salt selected should be such that homopolymerization is retarded to the extent desired.

The results in Table I also show that the type of base film employed is not critical to obtaining an acceptable percent graft or to the resistivity of the membrane. These results illustrate that the type of base film can be varied over a wide range.

Table II illustrates the grafting of acrylic acid onto different base films in the presence of varying quantities of cupric sulfate.

TABLE II

Grafting of Acrylic Acid Onto Different Films in Water Solution in the Presence Copper Salts

| Ex | 1 mil Polymeric BASE FILM | Weight % AA | Weight % $CuSO_4 \cdot 5H_2O$ | DOSE RATE rad/hr | TOTAL DOSE, Mrad | % GRAFT | RESISTANCE 40% KOH $m\Omega - in^2$ | QUANTITY OF HOMOPOLYMER |
|---|---|---|---|---|---|---|---|---|
| 22 | LPDE | 20 | 8 | 6894 | 0.55 | 52 | 12 | Slight |
| 23 | LPDE | 20 | 6 | 6894 | 0.55 | 43 | 13 | Slight |
| 24 | LPDE | 20 | 4 | 6894 | 0.55 | 37 | 36 | Slight |
| 25 | LPDE | 20 | 2 | 6894 | 0.55 | 37 | 13 | Slight |
| 26 | HDPE | 20 | 4 | 6763 | 0.56 | 25 | 29 | Slight |
| 27 | HDPE | 20 | 3 | 6763 | 0.55 | 49 | 10 | Slight |
| 28 | HDPE | 20 | 2 | 6763 | 0.55 | 58 | 14 | Slight |
| 29 | HDPE | 20 | 1 | 6763 | 0.55 | 54 | 9 | Slight |

TABLE II-continued

Grafting of Acrylic Acid Onto Different Films in
Water Solution in the Presence Copper Salts

| Ex | 1 mil Polymeric BASE FILM | Weight % AA | Weight % CuSO$_4$ . 5H$_2$O | DOSE RATE rad/hr | TOTAL DOSE, Mrad | % GRAFT | RESISTANCE 40% KOH mΩ − in$^2$ | QUANTITY OF HOMOPOLYMER |
|---|---|---|---|---|---|---|---|---|
| 30 | PE | 20 | 4 | 6763 | 0.56 | 47 | 26 | Slight |
| 31 | PE | 20 | 3 | 6763 | 0.55 | 40 | 20 | Slight |
| 32 | PE | 20 | 2 | 6763 | 0.55 | 64 | 16 | Slight |
| 33 | PE | 20 | 1 | 6763 | 0.55 | 54 | 24 | Slight |
| 34 | PP | 20 | 4 | 6763 | 0.56 | 62 | 42 | Slight |
| 35 | PP | 20 | 3 | 6763 | 0.55 | 42 | 9 | Slight |
| 36 | PP | 20 | 2 | 6763 | 0.55 | 47 | 11 | Slight |
| 37 | PP | 20 | 1 | 6763 | 0.55 | 48 | 16 | Slight |
| 38 | TEFLON | 20 | 4 | 6763 | 0.56 | 62 | 42 | Slight |

A comparison of the results shown in Tables I and II indicates that the use of ferrous sulfate provides a greater degree of acrylic acid grafting than does the use of cupric sulfate. However, in either case, the percentage and uniformity of grafting and the resultant resistivity are well within acceptable limits, which shows that the type of homopolymerization retarding salt employed is not critical to the effectiveness of the process of this invention.

Table III illustrates the grafting of methacrylic acid onto different base films in the presence of varying amounts of cupric sulfate salt.

III with those shown in Table II shows that the use or methacrylic acid with cupric sulfate provides for a membrane with slightly superior performance characteristics. However, in either case, the characteristics are well within acceptable levels and indicate that the type of hydrophilic grafting monomer employed is not a critical limitation to the effectiveness of the process of this invention.

As indicated hereinabove, polymeric base film of varying film thicknesses can be employed in the process of this invention. Table IV sets forth the process parameters and the properties of resulting separator mem-

TABLE III

Grafting of Methacrylic Acid Onto Different Films in
Water Solution in the Presence of Copper Salts

| Ex | 1 mil Polymeric BASE FILM | Weight % MA | Weight % CuSO$_4$ . 5H$_2$O | DOSE RATE rad/hr | TOTAL DOSE, Mrad | % GRAFT | RESISTANCE 40% KOH mΩ − in$^2$ | QUANTITY OF HOMOPOLYMER |
|---|---|---|---|---|---|---|---|---|
| 39 | LDPE | 20 | 4 | 6894 | 0.55 | 277 | 11 | Slight |
| 40 | LDPE | 10 | 4 | 6763 | 0.54 | 253 | 3 | Slight |
| 41 | LDPE | 5 | 4 | 6763 | 0.54 | 56 | 15 | Slight |
| 42 | LDPE | 5 | 3 | 6763 | 0.54 | 55 | 15 | Slight |
| 43 | LDPE | 5 | 2 | 6763 | 0.54 | 53 | 15 | Slight |
| 44 | LDPE | 5 | 1 | 6763 | 0.54 | 60 | 15 | Slight |
| 45 | HDPE | 20 | 4 | 6763 | 0.56 | 264 | 5 | Slight |
| 46 | HDPE | 20 | 3 | 6763 | 0.56 | 320 | 5 | Slight |
| 47 | HDPE | 20 | 2 | 6763 | 0.56 | 308 | 5 | Slight |
| 48 | HDPE | 20 | 1 | 6763 | 0.56 | 322 | 5 | Slight |
| 49 | PE | 20 | 4 | 6763 | 0.56 | 321 | 5 | Slight |
| 50 | PE | 20 | 3 | 6763 | 0.56 | 365 | 6 | Slight |
| 51 | PE | 20 | 2 | 6763 | 0.56 | 470 | 6 | Slight |
| 52 | PE | 20 | 1 | 6763 | 0.56 | 335 | 6 | Slight |
| 53 | PE | 20 | 0.5 | 6763 | 0.56 | 495 | 6 | Slight |
| 54 | PP | 20 | 4 | 6763 | 0.56 | 135 | 10 | Slight |
| 55 | PP | 20 | 3 | 6763 | 0.56 | 42 | 9 | Slight |
| 56 | PP | 20 | 2 | 6763 | 0.56 | 47 | 11 | Slight |
| 57 | PP | 20 | 1 | 6763 | 0.56 | 48 | 16 | Slight |
| 58 | TEFLON | 20 | 4 | 6763 | 0.56 | 112 | 10 | Slight |
| 59 | TEFLON | 20 | 4 | 6763 | 0.56 | 50 | 10 | Slight |

The resulting separator membranes exhibit low electrical resistance, and the grafting level is acceptable and uniform. A comparison of the results set forth in Table branes where base films of varying thicknesses are employed.

TABLE IV

Grafting of Acrylic Acid Onto Films of Differing Thickness
in Water Solution in the Presence of Iron Salts

| Ex | Polymeric BASE FILM | Thickness of the Film in Mils | Weight % AA | Weight % FeSO$_4$ . 7H$_2$O | DOSE RATE rad/hr | TOTAL DOSE, Mrad | % GRAFT | RESISTENCE 40% KOH mΩ − in$^2$ | QUANTITY OF HOMO-POLYMER |
|---|---|---|---|---|---|---|---|---|---|
| 60 | LPDE | 1 Mil | 20 | 4 | 7304 | 0.59 | 60 | 10 | Slight |
| 61 | LPDE | 2 Mil | 20 | 4 | 6763 | 0.55 | 54 | 14 | Slight |
| 62 | LPDE | 3 Mil | 20 | 4 | 6763 | 0.55 | 51 | 32 | Slight |
| 63 | HPDE | 1 Mil | 20 | 1 | 7304 | 0.59 | 62 | 13 | Slight |
| 64 | HPDE | 2 Mil | 20 | 1 | 6507 | 0.50 | 40 | 50 | Slight |
| 65 | HPDE | ½ Mil | 10 | 1 | 21,472 | 0.31 | 35 | 7 | Slight |
| 66 | PP | 1 Mil | 20 | 4 | 5518 | 0.49 | 40 | 20 | Slight |
| 67 | PP | 3 Mil | 20 | 4 | 6763 | 1.00 | 45 | 45 | Slight |
| 68 | TEFLON | 1 Mil | 20 | 1 | 6507 | 0.53 | 30 | 20 | Slight |

TABLE IV-continued
Grafting of Acrylic Acid Onto Films of Differing Thickness in Water Solution in the Presence of Iron Salts

| Ex | Polymeric BASE FILM | Thickness of the Film in Mils | Weight % AA | Weight % FeSO$_4$ . 7H$_2$O | DOSE RATE rad/hr | TOTAL DOSE, Mrad | % GRAFT | RESISTENCE 40% KOH m$\Omega$ - in$^2$ | QUANTITY OF HOMO- POLYMER |
|---|---|---|---|---|---|---|---|---|---|
| 69 | TEFLON | 2 Mil | 20 | 1 | 6507 | 0.53 | 25 | 30 | Slight |

The results show that increased thickness lowers the weight percent graft slightly. However, the percentage and uniformity of graft, and the electrical resistance are well within acceptable levels. These thicker membranes possess excellent mechanical strength and are useful for those applications where strength is desired.

The results of grafting at varying dose rates and total doses are illustrated in Table IV.

TABLE V
Grafting of Acrylic Acid Onto Polyethylene Films At Different Dose Rates and Total Doses

| Ex | 1 mil Polymeric BASE FILM | Weight % AA | Weight % FeSO$_4$ . 7H$_2$O | DOSE RATE rad/hr | TOTAL DOSE, Mrad | % GRAFT | RESISTANCE 40% KOH m$\Omega$ - in$^2$ | QUANTITY OF HOMOPOLYMER |
|---|---|---|---|---|---|---|---|---|
| 70 | PE | 10 | 1 | 12621 | 0.075 | 18 | 30 | Slight |
| 71 | PE | 10 | 1 | 12621 | 0.25 | 47 | 22 | Slight |
| 72 | PE | 10 | 1 | 12621 | 0.30 | 55 | 20 | Slight |
| 73 | PE | 10 | 1 | 12621 | 0.55 | 55 | 20 | Slight |
| 74 | PE | 10 | 10 | 6763 | 0.54 | 55 | 17 | Slight |

As can be seen from Table V, the persent graft increases with increasing total dose and then levels off. These results indicate that the percent graft is dose dependent, therefore, the total dose should be selected so as to provide the desired percent graft. It has been found that acceptable percent graft can be obtained when using a total dose as low as 0.075 Mrad, and as high as 29 Mrad and higher. The results also indicate that the percent graft is not sensitive to the dose rate, accordingly, the rate can be varied over a wide range without adversely affecting the percent graft. Thus, in the present invention, high dose rates can be employed to obtain acceptable levels of graft in a matter of hours, or relatively low dose rates can be employed to obtain good results employing longer irradiation periods.

This invention has been described in terms of the specific embodiments set forth in detail. Alternative embodiments and modifications will be apparent to those skilled in the art from this disclosure, and, accordingly, such embodiments and modifications are within the spirit and scope of this invention as described and claimed herein.

What is claimed is:

1. A process for the preparation of a separator membrane suitable for use in electrochemical cells comprising the steps of:
   (a) forming a graft polymerization medium consisting substantially of water, from about 0.5 to about 25 weight percent of one or more ethylenically unsaturated hydrophilic monomers and one or more polymerization retardants selected from the group consisting of water soluble cupric salts, ferrous salts or mixtures thereof, in an amount sufficient to retard the polymerization of said monomers;
   (b) placing said medium in contact with an inert polymeric base film; and
   (c) irradiating said film while in contact with said medium with sufficient radiation to graft polymerize said monomers onto said film, wherein all weight percents are based on the total weight of the medium.

2. A process according to claim 1, wherein said irradiating step is with gamma radiation at a total dose sufficient to provide up to 500 weight percent graft, wherein the weight percent is based on the total weight of the membrane.

3. A process according to claim 2, wherein said irradiating step is with gamma radiation at a total dose of from about 0.075 to about 10.0 Mrad.

4. A process according to claim 1, wherein said medium comprises from about 0.1 to about 10 weight percent of said polymerization retardants.

5. A process according to claim 1, wherein said polymerization retardant is selected from the group consisting of ferrous sulfate, ammonium ferrous sulfate, ferrous chloride, ferrous nitrate, cupric sulfate, cupric chloride, cupric nitrate, cupric acetate and mixtures thereof.

6. A process according to claim 5, wherein said retardant is ferrous sulfate or cupric sulfate.

7. A process according to claim 1, wherein said irradiating dose rate is from about 3000 to about 30,000 r/hr.

8. A process according to claim 1, wherein said base film is selected from the group consisting of:
   (a) polymer films of ethylenically unsaturated monomers having from 2 to 3 carbon atoms;
   (b) polymer films of halogenated ethylenically unsaturated monomers having from 2 to 3 carbon atoms;
   (c) copolymer films of said unsaturated monomers and said halongenated unsaturated monomers; and
   (d) laminated films thereof.

9. A process according to claim 8, wherein said base film is selected from the group consisting of polypropylene film, polyethylene film, polytetrafluoroethylene film, polytrifluorochloroethylene film, tetrafluoroethylene hexafluoroethylene copolymer film, tetrafluoroethylene-ethylene copolymer film and laminated films thereof.

10. A process according to claim 1, wherein said hydrophilic monomer is selected from the group consisting of ethylenically unsaturated aromatic and aliphatic hydrocarbons containing hydrophilic functional groups.

11. A process according to claim 10, wherein said hydrophilic monomer is acrylic acid or methacrylic acid.

12. The process of claim 1 wherein said polymerization retardant is about from 0.5 to 8 weight percent of said medium.

13. The process of claim 1 wherein said retardant is ferrous sulfate or cupric sulfate, wherein said hydrophilic monomer is acrylic acid or methacrylic acid, wherein said base film is polyethylene, polypropylene or polytetrafluoroethylene.

14. The process of claims 1 or 13 wherein dissolved oxygen is removed from said medium prior to said irradiating.

15. The process of claims 1 or 13 wherein the base film is covered with an absorbant interlayer and wound into a roll, said roll is immersed in said polymerization medium, dissolved oxygen is removed from said medium and said irradiating is conducted.

16. The process of claims 1 or 13 wherein said electrochemical cell is a secondary electrochemical cell having a catholyte compartment which contains a positive electrode selected from the group consisting of silver or nickel, and an anolyte compartment which contains a negative electrode selected from the group consisting of zinc or cadmium.

* * * * *

UNITED STATES PATENT AND TRADEMARK OFFICE
CERTIFICATE OF CORRECTION

PATENT NO. : 4,339,473
DATED : July 13, 1982
INVENTOR(S) : D'Agostino et al

It is certified that error appears in the above—identified patent and that said Letters Patent is hereby corrected as shown below:

Col. 4, line 6, change "sufonation" to --sulfonation--.

Col. 6, line 47, change "denity" to --density--.

In Table I (following Col. 8), in Ex. 16, under column entitled "Resistance ...", change "slight" to --11--.

In Table I (following Col. 8), in Ex. 16, under column entitled "Quantity of Homopolymer", insert --slight--.

Signed and Sealed this

Twenty-third Day of November 1982

[SEAL]

Attest:

GERALD J. MOSSINGHOFF

Attesting Officer　　Commissioner of Patents and Trademarks